Figure 1:
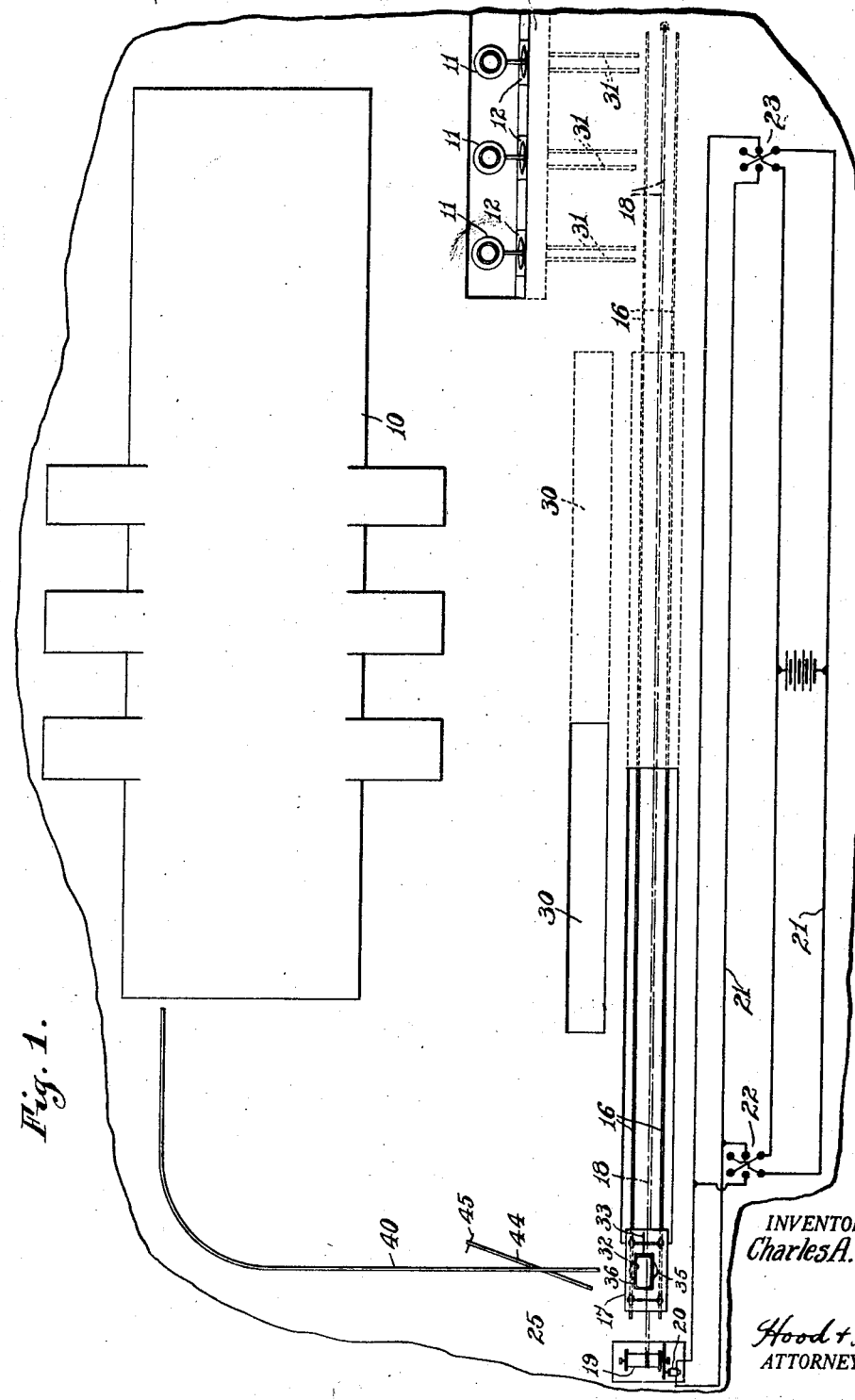

Dec. 15, 1925.

C. A. SMITH 1,566,252

METHOD OF AND APPARATUS FOR HANDLING CAVE GLASS IN DRAWING OPERATIONS

Filed Feb. 24, 1925

3 Sheets-Sheet 1

INVENTOR.
Charles A. Smith,

Hood + Hahn
ATTORNEYS

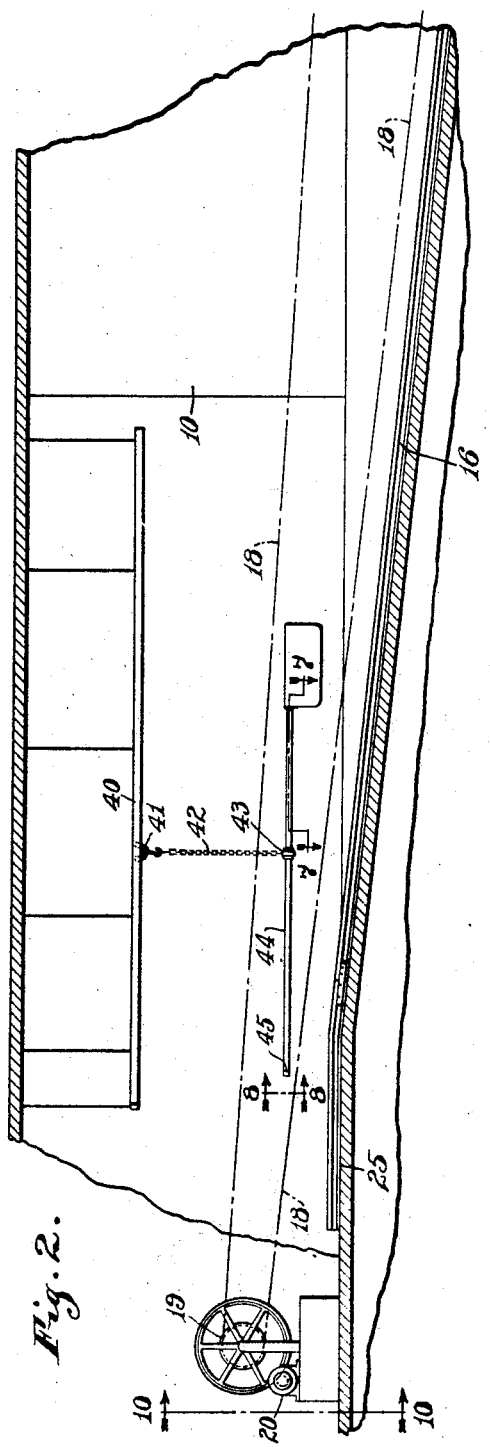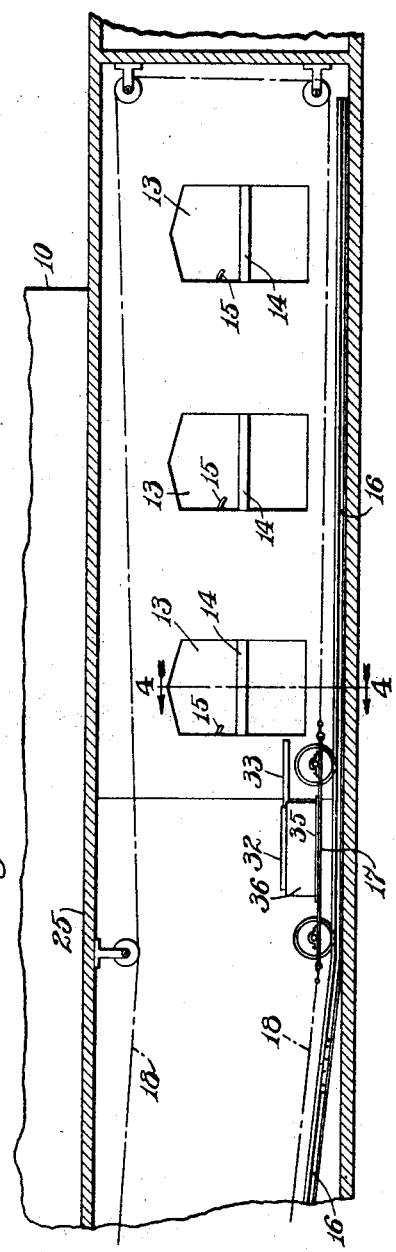

Dec. 15, 1925.                                                          1,566,252
C. A. SMITH
METHOD OF AND APPARATUS FOR HANDLING CAVE GLASS IN DRAWING OPERATIONS
Filed Feb. 24, 1925                              3 Sheets-Sheet 3
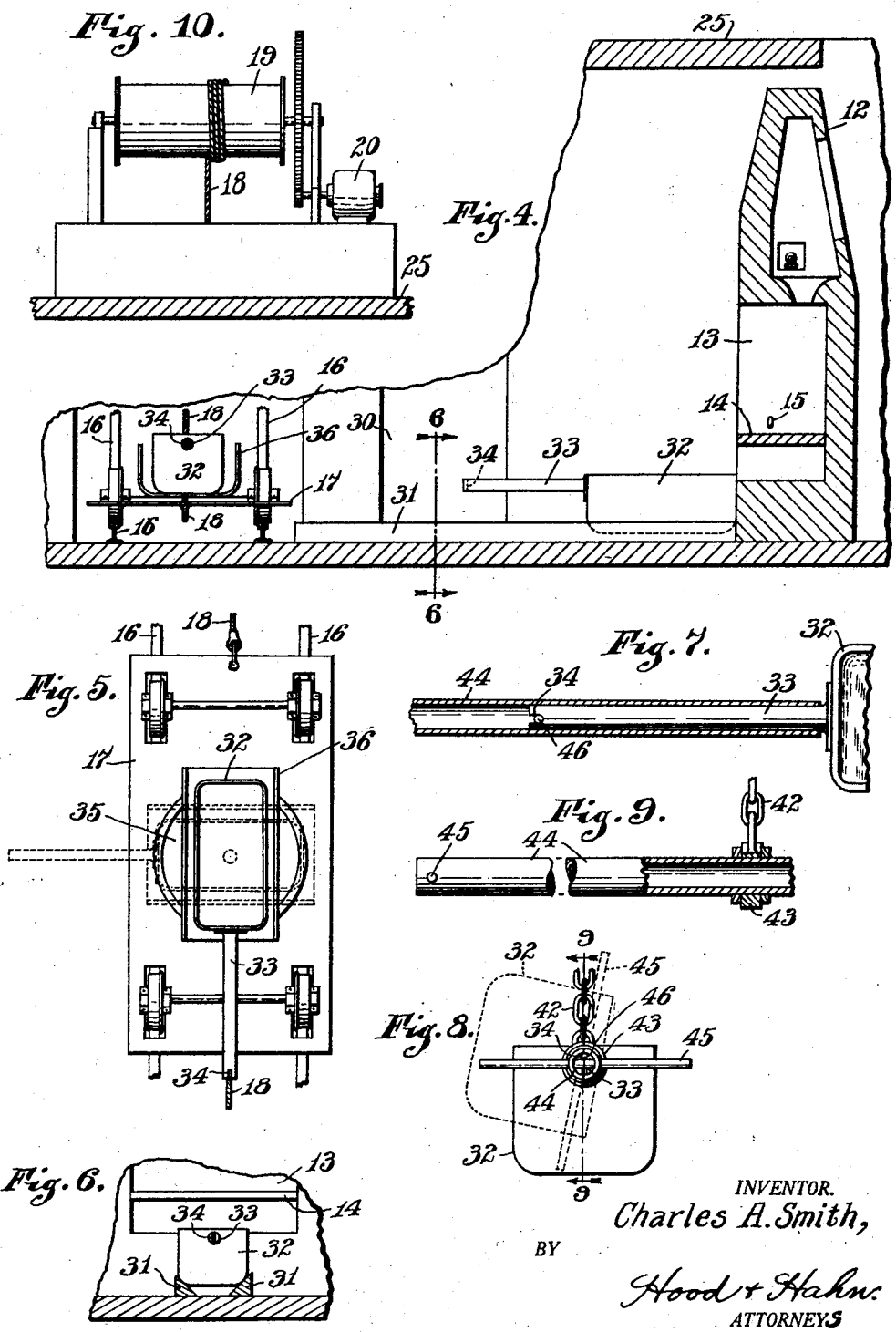
INVENTOR.
Charles A. Smith,
BY
Hood + Hahn.
ATTORNEYS Patented Dec. 15, 1925.

1,566,252

UNITED STATES PATENT OFFICE.

CHARLES A. SMITH, OF INDEPENDENCE, KANSAS, ASSIGNOR TO THE NATIONAL SASH AND DOOR COMPANY, OF INDEPENDENCE, KANSAS, A CORPORATION OF KANSAS.

METHOD OF AND APPARATUS FOR HANDLING CAVE GLASS IN DRAWING OPERATIONS.

Application filed February 24, 1925. Serial No. 11,116.

*To all whom it may concern:*

Be it known that I, CHARLES A. SMITH, a citizen of the United States, residing at Independence, in the county of Montgomery and State of Kansas, have invented a new and useful Method of and Apparatus for Handling Cave Glass in Drawing Operations, of which the following is a specification.

In the production of window glass involving the drawing of cylinders from baths of molten glass contained in pots, there is a remnant of glass left in each pot which must be melted out and returned to the melting tank.

Heretofore it has been the practice to chill and break up this remnant before deposit in the melting tank and the handling of the remnant from the melting out kiln to the melting tank has required the labor of several workmen.

The object of my present invention is to provide a method of and means for handling remnants of glass resulting from molten glass manipulations, from the manipulating apparatus to the melting tank, with a minimum amount of labor and a minimum loss of heat.

The accompanying drawings illustrate my invention. Fig. 1 is a diagrammatic plan illustrating the apparatus and associated parts; Fig. 2 a diagrammatic vertical section on a larger scale of the delivery end of my system; Fig. 3 a similar view of the receiving end; Fig. 4 a vertical section, on a larger scale, on line 4—4 of Fig. 3; Fig. 5 a plan of the ladle carriage; Fig. 6 a section on line 6—6 of Fig. 4; Fig. 7 a section on a larger scale, on line 7—7 of Fig. 2; Fig. 8 a fragmentary elevation on line 8—8 of Fig. 2, on a larger scale; Fig. 9 a vertical section on line 9—9 of Fig. 8, and Fig. 10 an elevation on a larger scale on line 10—10 of Fig. 2.

In the drawings 10 indicates a melting tank, 11, 11, 11 glass drawing apparatus of the pot type, 12, 12, 12 associated melting out kilns, forming part of the glass drawing apparatus, and 13, 13, 13 caves, one associated with each melting out kiln, into which the remnant from the pots is drained, each of said caves having a receiving plate 14 arranged to receive the drainage from the associated melting kiln. In order that the glass may not stick to plate 14 it is kept sufficiently cool by a small quantity of water discharged thereon from a water pipe 15, the flow of water being reduced to a minimum just sufficient to keep the plate partially cool, enough to prevent sticking, so that the mass of glass drained upon the plate 14 will be chilled as little as possible.

Arranged along in front of the several caves 13 is a track 16 upon which is mounted a wheeled carriage 17 movable along the track by means of an endless cable 18 passing over a windlass 19 driven in either direction by a reversible motor 20, said motor being in a controlling circuit 21 embodying an automatic cut-out switch 22 and a hand controlled reversing switch 23. Track 16, at one end, is on the floor of the cellar in which the caves 13 are located and at its other end is on the floor level 25 of the tank and drawing apparatus.

Switch 23 is located at a point convenient of access adjacent the caves and switch 22 is arranged to be automatically engaged by the carriage 17 when it has reached the upper level of track 16, as indicated in Fig. 1, so as to cause the motor to stop when the carriage has reached this point.

Arranged alongside of track 16 and extending between the upper and lower floor levels is a run-way 30 for the operator.

Arranged upon the lower floor and extending outwardly from each cave are guides 31 arranged to facilitate the placing and handling of a ladle 32 in glass-receiving position adjacent the delivery edge of each plate 14.

The ladle 32 is provided with a short handle 33 provided in its end with a diametrical slot 34.

Mounted upon carriage 17 in a turntable 35, having a vertical axis and said turntable is provided with an open-ended trough 36 adapted to receive and support ladle 32.

Arranged above floor 25, opposite the upper end of travel of carriage 17, is an overhead track 40 upon which is mounted a trolley 41 from which is suspended a chain 42 having collar 43 at its lower end. Journaled in collar 43, and conveniently balanced thereon, is a lever 44 provided at one end with a cross-bar handle 45 and tubular at the other end so as to telescope over the ladle handle 33, said tubular portion being provided with a diametrical cross-pin 46 adapted to enter slot 34 when the lever has been fully telescoped upon the ladle handle, the arrangement being such that, when lever 44 has been fully telescoped upon the ladle handle, the ladle may be supported by chain 42 and the operator engaging handle 45, and may be inverted about the axis of lever 44.

Track 40 extends to a point adjacent an opening in the charging end of the melting tank so that the contents of a ladle 32 may be readily dumped into the melting tank.

The operation is as follows:

During the drawing operation there is also a melting out operation in the kilns 12, the glass draining downwardly onto plates 14 and accumulating there. When a sufficient quantity has accumulated the operator places a ladle 32 in the position shown in Fig. 4 and rakes out the accumulated glass into the ladle. When a sufficient quantity has been deposited in the ladle, the operator, by manipulating switch 23 brings carriage 17 to a position opposite the proper guides 31 and, after turning trough 36 to the position shown in dotted lines in Fig. 5, drags the loaded ladle into the trough and turns the same to the position shown in full lines in Fig. 5. The operator then manipulates switch 23 so as to start carriage 17 along its track to the delivery end and, leaving the cellar by run-way 30, reaches the delivery end of the track by the time the car reaches said end and automatically stops by throwing switch 22. The operator then swings the turn-table 35 so as to direct handle 33 towards track 40 whereupon, by grasping lever 44 he telescopes said lever over ladle handle 33 and drives pin 46 into slot 34, whereupon, by pressing down upon the handle end of lever 44, he may withdraw the ladle from trough 36 and transport the same along track 40 to the melting tank 10, inserting the ladle into the receiving end of the tank and readily inverting it to discharge its contents into the body of molten glass in the tank where, owing to the very large amount of heat still retained in the mass, said mass is quickly remelted with a minimum expenditure of fuel.

The operator then returns the ladle to trough 36, turns the turn-table 35 upon carriage 17, manipulates switch 22 to cause a reverse movement of the carriage and returns to the cellar by way of run-way 30 in time to control the positioning of the carriage adjacent any appropriate caves.

During his absence quantities of molten glass have accumulated upon the various plates 14 and by proper placing of ladle 32 the contents may be drawn and the operation repeated.

It will be noted that a single operator is all the labor needed to transfer the drained glass from the caves to the melting tank and that the drained glass is introduced into the melting tank in a still plastic condition, retaining a very large proportion of its heat so that there is a very substantial saving in fuel required for the remelting.

It will, of course, be understood that a very considerable number of draining stations may be attended to by a single operator.

I claim as my invention:

1. The method of handling cave glass in glass drawing operations, comprising the draining of a glass receptacle under the action of heat, the deposit of said glass in a plastic condition into a receptacle, the transfer of said receptacle with the still plastic glass from the draining station to a melting tank, and the deposit of said glass in a plastic condition into said melting tank.

2. An apparatus for handling drained glass, comprising a melting tank, a draining station, a transfer carriage and suitable runway therefor leading from the draining station toward the melting tank, a receptacle for molten glass adapted to be carried by said carriage, and means by which said receptacle may be transported from the carriage to the tank and its contents discharged into the tank.

3. An apparatus for handling drained glass, comprising a melting tank, a draining station, a transfer carriage and suitable runway there leading from the draining station toward the melting tank, means for propelling said transfer carriage along said runway, means for controlling the movement of said carriage along the runway, a receptacle for molten glass adapted to be carried by said carriage, and means by which said receptacle may be transported from the carriage to the tank and its contents discharged into the tank.

4. An apparatus for handling drained glass, comprising a melting tank, a draining station, a transfer carriage and suitable runway therefor leading from the draining station toward the melting tank, a receptacle for molten glass adapted to be carried by said carriage, a second runway, a second carriage thereon and a lever swingably and rotatively mounted on said second carriage and formed to engage and support the receptacle whereby said receptacle may be removed from the first carriage and transported to the melting tank.

5. An apparatus for handling drained glass, comprising a melting tank, a draining station, a transfer carriage and suitable runway therefor, leading from the draining station toward the melting tank, means for propelling said transfer carriage along said runway, means for controlling the movement of said carriage along the runway, a receptacle for molten glass adapted to be carried by said carriage, a second runway, a second carriage thereon and a lever swingably and rotatively mounted on said second carriage and formed to engage and support the receptacle whereby said receptacle may be removed from the first carriage and transported to the melting tank.

6. A molten-glass handling apparatus comprising a carriage, an open-ended trough-like ladle receiver rotatably mounted on a vertical axis on said carriage, and a ladle receivable in and removable from said receiver.

7. A molten-glass handling apparatus comprising a carriage, an open-ended trough-like ladle receiver rotatably mounted on a vertical axis on said carriage, and a ladle receivable in and removable from said receiver, said ladle having a comparatively short handle.

8. A glass handling apparatus comprising heat applying draining means at one level, a glass melting tank at a higher level, a track extending from the draining station at the lower level to a higher level adjacent the receiving end of the melting tank, a carriage movable along said track and formed to receive a molten glass receptacle, a second track extending from a point adjacent the upper level of the first track to a point adjacent the receiving end of the melting tank, a second carriage mounted on said second track, and means carried by said second carriage for separable engagement with the glass receptacle whereby said receptacle may be transported from the first carriage to the receiving end of the melting tank and its contents discharged thereinto.

9. A glass handling apparatus comprising a transfer carriage and an open-ended trough-like ladle receptacle mounted thereon upon a vertical axis.

In witness whereof, I have hereunto set my hand at Independence, Kansas, this 16" day of February, A. D. one thousand nine hundred and twenty-five.

CHARLES A. SMITH.